Oct. 10, 1939. C. H. STANARD 2,175,449
REMOTE CONTROL FOR TRANSMISSIONS
Filed July 11, 1938 3 Sheets-Sheet 2
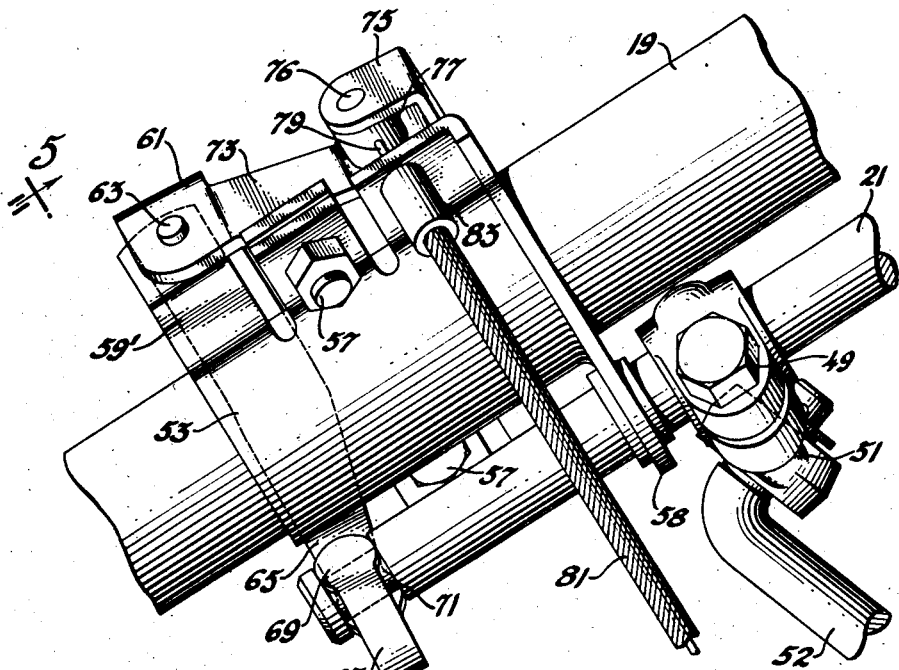
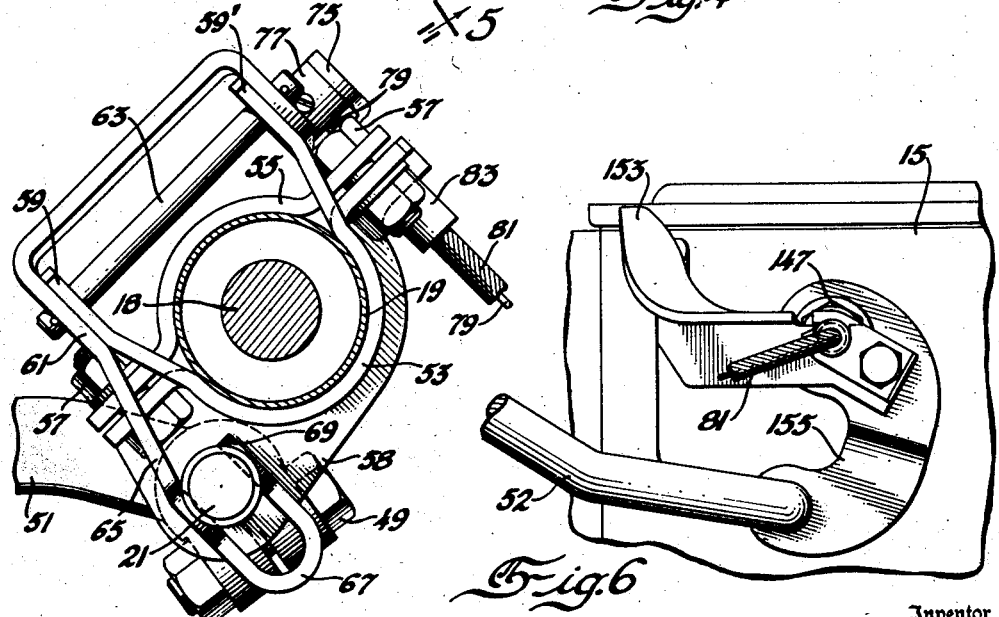
Inventor
Charles H. Stanard
By Blackmore, Semert & Flint
Attorneys

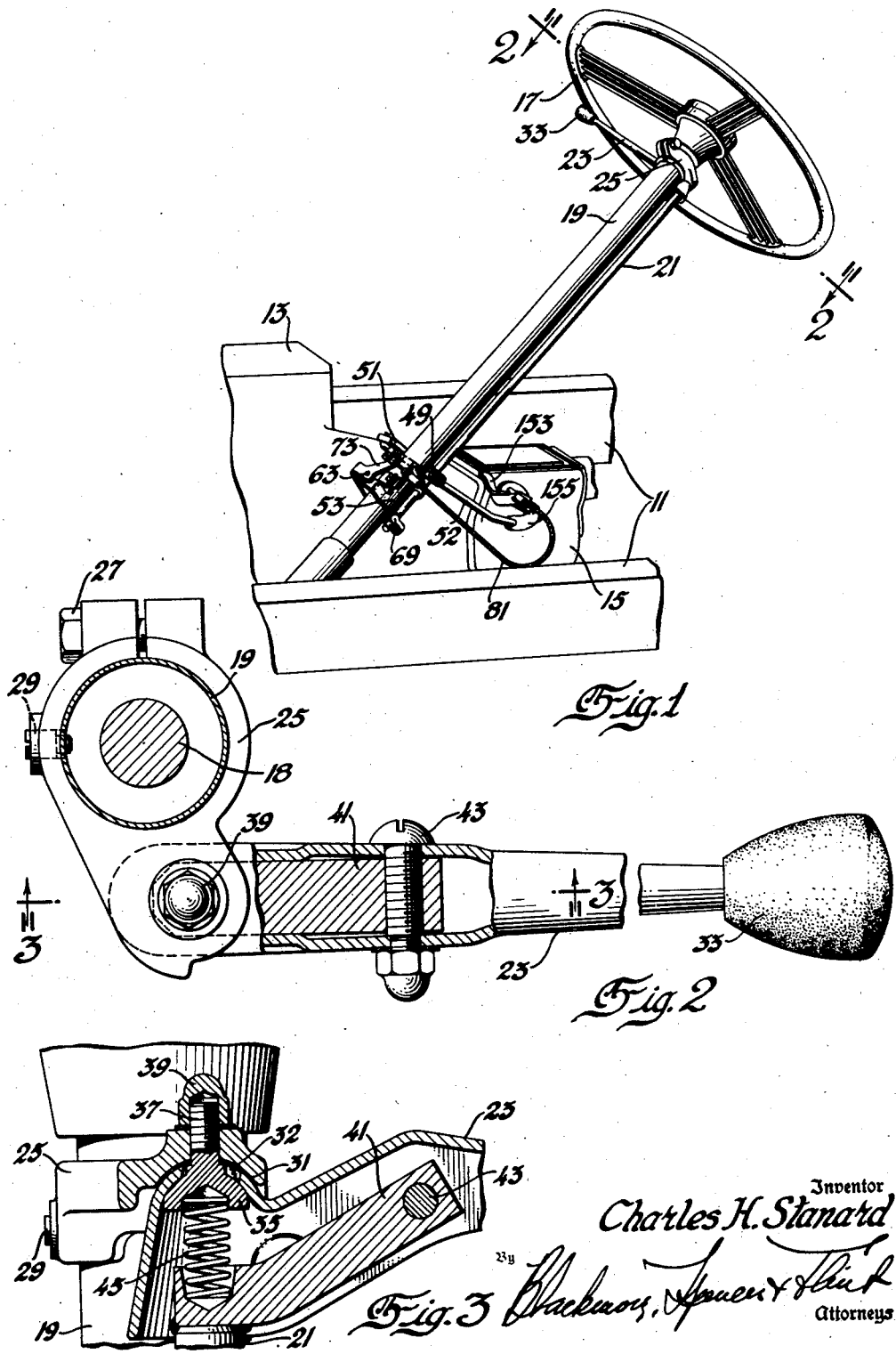

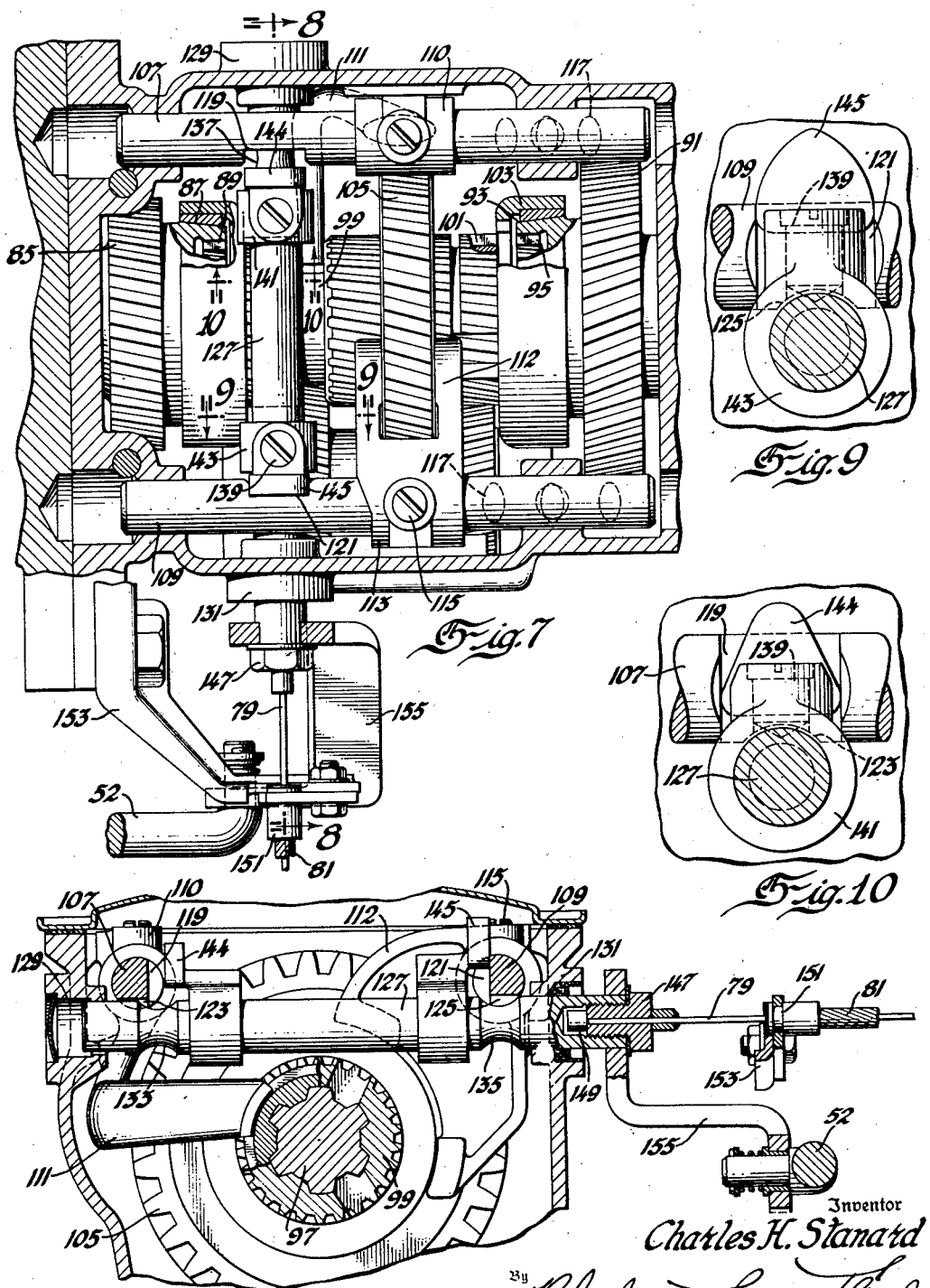

Patented Oct. 10, 1939

2,175,449

UNITED STATES PATENT OFFICE 2,175,449

REMOTE CONTROL FOR TRANSMISSIONS

Charles H. Stanard, Flint, Mich., assignor to General Motors Corporation, Detroit, Mich., a corporation of Delaware Application July 11, 1938, Serial No. 218,571

7 Claims. (Cl. 74—477)

This invention relates to change speed mechanism for motor vehicles and has been designed for changing the gear ratio by manually operable means conveniently located for operation. It provides a so-called remote control wherein novel structural arrangements have been made which constitute the subject matter of this application.

An object of the invention is the avoidance of the conventional shift lever extending from the gear box through the floor of the car body.

A further object is the location adjacent the steering wheel of a manually operable lever which performs the function of the conventional shift lever.

In the accomplishment of the object of the invention certain novel structure has been adopted in the gear box and in the connection between the manually operable lever and the modification within the gear box. The modified construction of the mechanism within the gear housing is more particularly the subject matter of this application.

The invention is illustrated by the accompanying drawings wherein:

Figure 1 is a view in side elevation of the assembly used in making gear ratio changes.

Figure 2 is a view as seen from line 2—2 of Figure 1.

Figure 3 is a section on line 3—3 of Figure 2.

Figure 4 is a view in elevation adjacent the lower end of the steering column.

Figure 5 is a sectional view as seen from line 5—5 of Figure 4.

Figure 6 is a side elevation facing the side wall of the transmission housing.

Figure 7 is a horizontal section through the top of the gear box.

Figure 8 is a section on line 8—8 of Figure 7.

Figure 9 is a section on line 9—9 of Figure 7.

Figure 10 is a section on line 10—10 of Figure 7.

Numeral 11 shows the frame of a motor vehicle, the engine and the clutch housing being marked 13 and the gear box 15. The hand steering wheel 17 operates a steering post 18 within a fixed steering column 19. Alongside the steering column is a shaft 21 which is mounted to reciprocate and also to rotate on its axis. A lever 23 is used to effect both these movements. As will be explained below, a tilting of the lever serves to make a selection of driving ratios and a rocking of the lever about an axis coincident with the axis of the shaft 21 makes the ratio shifts. Adjacent the top of the steering column 19 is a bracket 25 held clamped to the column by securing means 27 and by retaining means 29. The bracket is formed with a spherical socket 31 which serves as a fulcrum for the tilting and the rocking of lever 23. This hand lever 23 is of channel shape and has a hand grip 33. Its end is shaped as shown in Figure 3 to fit the socket 31. The lever is held within the socket by a suitably shaped head 35 of a bolt 37, the shank of which extends through an enlarged opening 32 in the end of the lever 23 an an opening in the bracket and is held in position by a nut 39. The enlarged opening 32 permits tilting of the lever. The shank of the bolt is in alignment with the axis of shaft 21 as shown in Figure 3. Shaft 21 has secured thereto an angular arm 41. This arm extends between the arms of lever 23 and is pivoted thereto by pivot means 43. A coil spring 45 between the head 35 and the shaft end of arm 41 biases the shaft 21 to its lowermost position. If lever 23 be tilted upwardly it pivots within the socket 31 and since the arm 41 is pivoted to the lever 23 the shaft 21 is moved upwardly against the tension of spring 45.

Adjacent the lower end of the steering column the shaft 21 has clamped thereto as at 49 the hub of a lever arm 51. At the end of the arm there is attached thereto a link 52. A bracket 53 embraces the column near its lower end and below the arm 51 of shaft 21. This bracket is held by a cap 55 and fastening means 57. The bracket is formed at 58 with a support for the guidance of shaft 21. The bracket has two arms 59, 59' serving to journal a bell crank 61 mounted on a pin 63. The bell crank has one arm 65 provided with a bent end 67. The side of the arm and the bent end are provided with rounded parts 69 which are received within an annular recess 71 near the extreme end of shaft 21. The bell crank has another arm 73 extending upwardly. The extremity of this arm is reversely bent as at 75 and between the arm and the bent end is pivoted at 76 a block 77 to which is attached the end of a flexible cable 79. The cable extends through a cable housing 81, the latter being anchored to the bracket by any convenient means as shown at 83.

The novel structure within and adjacent the transmission housing is shown in Figures 7 and 8. The transmission gearing within the housing is not fully illustrated but those parts wherein departure from the conventional has been made are shown and will be described. At the left end of the gear housing is seen a gear 85 which gear is on the input shaft. Together with the gear there is shown a frictional clutch element 87 and a jaw clutch element 89. Gear 91 at the other end of the housing is similarly equipped with a friction clutch element 93 and a jaw clutch element 95. As in conventional gearing of this kind gear 91 is rotatably supported on an output shaft 97. Slidable on splines of the output shaft 97 is an elongated clutch sleeve 99. This sleeve has at its ends, teeth such as 101 for engagement with the teeth of jaw clutch 89 and jaw clutch 95. These engagements take place subsequent to the action of conventional synchronizing devices, these being designated by numeral 103. The clutch sleeve 99 has non-rotatably mounted but slidable thereon a gear 105, this gear being adapted to reciprocate to take a low speed drive from the countershaft or to take a reverse drive from a suitable reverse idler driven by the countershaft. From this brief description it will be seen that sleeve 99 must reciprocate to make shifts from a neutral position to high speed and to second speed. It will also be seen that gear 105 must be reciprocated to make shifts into low and into reverse.

Two shift rails 107 and 109 are provided, these shift rails being slidably mounted in the gear casing. To shift rail 107 is secured the hub portion 110 of a shifting arm 111 engaging a collar of sleeve 99. Similarly a hub 113 is held to rail 109 by fastening means 115 and it carries a fork 112 straddling gear 105. The two rails may be provided with notches 117 for detent balls to hold them in neutral positions or in driving positions. On adjacent faces of the rails are notches 119 and 121. On the lower parts of the rails are grooved recesses 123 and 125. Extending transversely of the gear casing and in the path of movement of the two rails is a shaft 127 which is circular in cross section. This shaft is mounted at its ends in the gear casing at 129 and 131. Adjacent each shift rail shaft 127 is formed with annular grooves 133 and 135. Also secured to this shaft 127 by fastening means 139 are hubs 141 and 143 from which project operating arms 144 and 145. These arms are shaped as shown in Figures 9 and 10. They selectively engage the rail notches 119 and 121. Reciprocation of shaft 127 affects the engagement of one or the other of the arms in its rail notch and rotation of the shaft reciprocates the selected rail. Arm 145 is shaped to give a substantially constant mechanical advantage, whereas arm 144 is shaped to give a changed mechanical advantage between the movement designed to operate the synchronizing clutch and the movement designed to effect the engagement of the jaw teeth.

It will be observed from Figure 8 that shaft 127 is within the path of movement of the shift rails as stated above but that one or the other of the rails may reciprocate provided the groove of shaft 127 is adjacent the rail, a position shown at the right hand side of Figure 8. When the position of reciprocation is such as to permit one rail to reciprocate it will be observed that the full diameter portion of shaft 127 is within the notch of the other rail so that said other rail may not reciprocate. This construction is seen at the left side of Figure 8. There is thus provided a very simple and effective interlocking expedient requiring the use of no parts in addition to those used in making the shifts. For reciprocating shaft 127 the end of the cable 79 is operably attached to the end of the shaft as shown in Figure 8. The end of shaft 127 is recessed and threaded therein is a nut 147. Through an aperture in this nut the end of the cable is extended. Within the space between the bottom of the recess and the end of nut 147 the cable carries an enlargement 149. The cable housing is secured as at 151 to a bracket 153 secured to the transmission casing. By this means the cable may reciprocate the shaft 127 and the rotation of the latter may take place with no interference with the flexible cable. At the end of shaft 127 adjacent the nut 147 is secured an arm 155 to which is connected, as shown in Figure 8, the end of the link 52 in any convenient or preferred manner. By means of this link axial rotation of shaft 21 rotates lever arm 155 which rotates shaft 127.

It will be understood that the tilting movement of the lever 23 serves to reciprocate shaft 21 and that this reciprocation operating through the flexible cable moves shaft 127 to selectively engage one or the other of the shift rails, the unselected rail being locked from reciprocation by engagement in the recess 123 or 125 as the case may be. Thereafter rotation of lever 23 rotates shaft 21 on its axis and this rotation of shaft 21 operates through the lever and link construction to rotate shaft 127 and thereby reciprocate the selected rail to introduce the desired driving ratio.

I claim:

1. In change speed transmission, a reciprocable rail, means associated with said rail to introduce a plurality of driving ratios, a reciprocable rockshaft extending at right angles to said rail, said rockshaft having an arm to operably engage and reciprocate said rail in response to rockshaft rotation in a selected position of axial reciprocation, said rail having a curvilinear recess to receive a part of said rockshaft in a second position of axial reciprocation of said rockshaft to prevent reciprocation of said rail.

2. In change speed transmission, two parallel reciprocable rails, means associated with said rails for introducing a plurality of driving ratios, a reciprocable rockshaft extending at right angles to said rails, lever arms on said rockshaft adapted to selectively engage said rails as said rockshaft is reciprocated, cooperating pairs of formations rigid with said rails and rockshaft, each pair including a formation on said rockshaft and a formation on one of said rails, the formations of one pair adapted to engage in response to rockshaft reciprocation and constitute interlocking means to lock either rail when the other is to be reciprocated, and means to rock and reciprocate said rockshaft.

3. In change speed transmission, two parallel reciprocable rails, means associated with said rails for introducing a plurality of driving ratios, a reciprocable rockshaft extending at right angles to said rails, lever arms on said rockshaft adapted to selectively engage said rails as said rockshaft is reciprocated, formations on said rails and rockshaft constituting interlocking means to lock either rail when the other is to be reciprocated, and means to rock and reciprocate said rockshaft, said interlocking means comprising rounded wall grooves in said rails to selectively receive parts of said rockshaft.

4. In change speed mechanism, shift rails, a selector shaft extending transversely of said rails, said rails having notches on adjacent faces and said selector shaft having arm means to selectively engage said notches in response to axial reciprocation thereof, said rails having rounded grooves to receive said selector shaft slidably and selectively whereby the engagement of said selector shaft with the groove of one of said rails prevents reciprocation of said rail, said selector shaft formed with circumferential grooves located adjacent the arms to selectively register with that rail, the notch of which is engaged by the arm means of the selector shaft.

5. The invention defined by claim 4, together with remotely located means to effect reciprocation and rotation of said selector shaft.

6. In a transmission, parallel shift rails, a selector shaft extending transversely of said shift rails and in the path of movement thereof, said shift rails having grooves wherein said selector shaft is adapted to be selectively received to permit reciprocation of the selector shaft but to prevent reciprocation of one or the other of the rails, said selector shaft having circumferential grooves to register selectively with said rails whereby one only of said rails may be reciprocated and means on said selector shaft to selectively engage said rails whereby rotation of said selector shaft may reciprocate a selected rail.

7. The invention defined by claim 6, together with manually operable means to reciprocate and rock said selector shaft.

CHARLES H. STANARD.